UNITED STATES PATENT OFFICE.

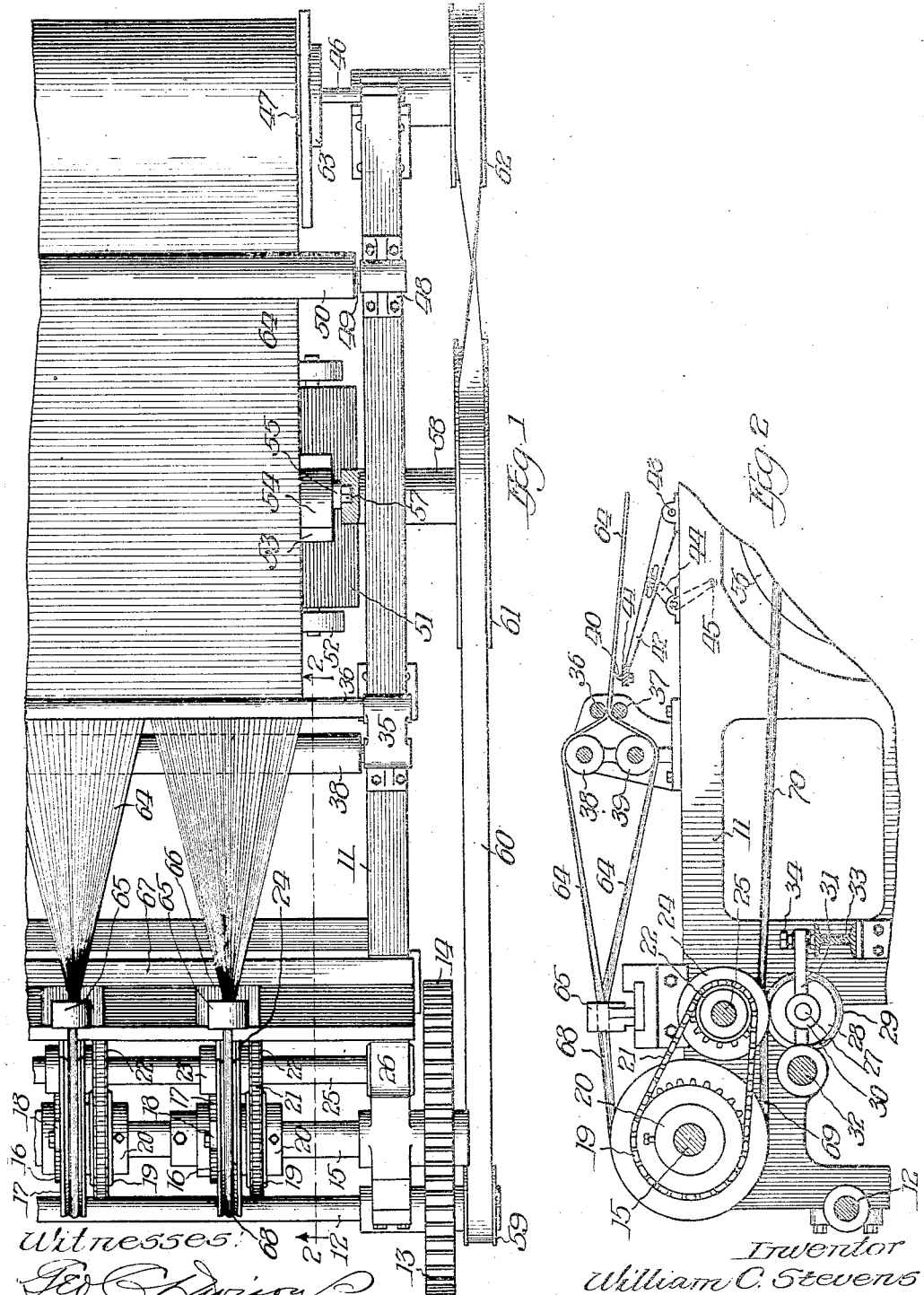

WILLIAM C. STEVENS, OF AKRON, OHIO, ASSIGNOR TO THE FIRESTONE TIRE & RUBBER COMPANY, OF AKRON, OHIO, A CORPORATION OF OHIO.

METHOD OF MAKING TIRE-BEADS.

1,122,813.  Specification of Letters Patent.  Patented Dec. 29, 1914.

Original application filed December 21, 1912, Serial No. 737,934. Divided and this application filed January 21, 1914. Serial No. 813,362.

*To all whom it may concern:*

Be it known that I, WILLIAM C. STEVENS, a citizen of the United States, residing at Akron, in the county of Summit and State of Ohio, have invented certain new and useful Improvements in Methods of Making Tire-Beads, being a division of my application Serial No. 737,934, filed December 21, 1912, and of which the following is a specification.

My invention relates to methods employed in the manufacture of pneumatic tires and particularly the forming of the rubber beads built into the marginal portions of such tires to provide the lateral offsets or lips which take under the flanges of the wheel rim to hold the tire in place upon the wheel.

These beads are usually of a substantially triangular cross-section and are composed of rubber containing a plurality of fibrous strands extending longitudinally thereof. In the formation of such beads I employ a plurality of strips torn from a fabric which is impregnated with rubber of such a nature as to be sticky, these strips being bunched into a fillet and passed through forming rolls under tension and pressure, the resultant bead lengths being then wound upon reels or drums and cured.

In order that the invention and the manner of its application may be readily understood by those skilled in the art, I have in the accompanying illustrative drawings and in the detailed following description based thereon set forth a preferred manner of carrying out the invention. In these drawings, Figure 1 is a top plan of a portion of a machine constructed for the carrying out of my invention; and Fig. 2 is a fragmentary longitudinal vertical section on the line 2—2 of Fig. 1.

Having reference to the drawings, the numeral 11 designates the machine frame in which is journaled the drive shaft 12 driven from any suitable source of power and provided with the drive pinion 13 which is in mesh with the gear wheel 14 mounted on the shaft 15 likewise journaled in the frame.

Upon the shaft 15 are splined a plurality of ratchet wheels designated by the numeral 16. Each of the ratchet wheels is associated with a fillet-forming wheel 17 to which it is operatively coupled by pawls 18 providing for relative movement of the ratchet and forming wheels in one direction only.

A sprocket 19 is fixedly mounted upon the hub 20 of each forming wheel, each of the sprockets 19 being connected by the sprocket chain 21 with the sprocket 22 carried by the hub 23 of a bead forming wheel 24 mounted upon the shaft 25 which is likewise journaled in the frame at 26.

The fillet-forming wheel 17 has a peripheral groove of substantially V-shape in cross section, the opposite faces thereof being knurled to present a roughened surface, and the bead forming wheel 24 is provided with a similar groove, the operative faces of which are smooth.

Immediately below the bead forming wheels 24 are mounted upon the floating shaft 27 a plurality of pressure rolls 28, each of which has a convex periphery 29, shown as having a cross section in the form of a truncated wedge, the convex periphery of each pressure roll 28 working in the groove of the corresponding bead forming wheel 24. The bead forming wheels 24 and the pressure rolls 28 are likewise splined or otherwise suitably secured upon their shafts 25 and 27 to provide for longitudinally shifting the same in unison with the shifting of the fillet-forming wheels 17. Adjustment of the pressure rolls 28 toward and from the bead forming wheels 24 is provided for by mounting the shaft 27 within collars 30 of the levers 31, one end of each lever being pivotally fulcrumed upon the shaft 32 which is suitably journaled in the frame while the opposite end of the lever is adjustably supported upon the cross beam 33 by means of the set screw 34.

Upon the top of the frame in one arm of the journal bracket 35 is mounted a pair of confining guide rolls 36 and 37 and in another arm of the same journal bracket is mounted a pair of separating rolls 38 and 39. Likewise mounted upon the top of the frame is mounted a set of slitting knives 40 shown for example as carried by a bar 41 extending transversely of the machine upon one end of lever arms 42 fulcrumed at 43 and adapted to be raised and lowered by means of an angle lever 44 pivoted to the frame and provided with an operating handle 45.

At that end of the machine opposite the forming wheels the frame is provided with journal bearings adapted to receive the shaft 46 of a fabric spool 47. Within the journal bracket 48 in front of the journal bearing of the shaft 46 is journaled a shaft 49 carrying a guide roll 50 extending transversely of the machine frame.

One side of the frame 11 is closed off in its medial portion by a longitudinal frame member, while from the opposite side of the frame, as will be seen, the corresponding member is omitted, the frame being formed somewhat as an arch so as to permit a car 51 mounted upon wheels 52 to be run beneath the machine. This car carries pillow blocks 53 provided with journal bearings 54 within which are mounted the two ends of the shaft 55 carrying a reel 56. One end of the shaft 55 projects beyond its journal bearing 64 and is squared, as shown at 57, for releasable engagement with a squared opening of the stub shaft 58 journaled in the machine frame.

Power is transmitted from the drive shaft 12 to the stub shaft 58 for the driving of the reel shaft 46 by means of a drive sheave 59 mounted on the end of the drive shaft, a friction belt 60 passing from said sheave around the sheave 61 of the stub shaft 58 and thence across and extending around the sheave 62 on the shaft of a liner winding reel 63, the tension of the belt being such as to permit slippage.

The machine is used in the following manner: Into its slotted journal bearing is slipped the shaft 46 of the reel 47 upon which is wound a supply of fabric 64. This fabric is heavily impregnated with a sticky rubber, the warp of the fabric being composed of longitudinal threads comparatively close together and of considerable strength, while the weft is composed of comparatively few threads of relatively small strength. Usually the sheet of fabric is 44 inches wide, this width being sufficient to make four beads simultaneously, 11 inches of fabric making a bead of standard size. The fabric passes from the reel 47 beneath the guide roll 50 and thence between the confining guide rolls 36 and 37. The slitting knives 40 which are preferably 175 in number, being arranged in their elevated position engage the fabric and slit the same for a distance of 1½ or 2 feet into strips one-quarter of an inch wide. These strips passing in alternation one above the separating roller 38 and the next below the separating roller 39, from whence they pass into bunching dies 65, four in number, having their bases 66 independently slidable within the guide 67 whereby they may be adjusted to occupy a position in the plane of the respective fillet-forming wheels 17, the mouth of each preferably flaring to facilitate the entrance of the strips. If the bead is to be formed of a size requiring 11 inches of the fabric, the four sets of forming wheels and dies are equally spaced over the width of the sheet and the 44 component quarter inch strips of each 11 inches of fabric pass alternately under and over the separating rolls 38 and 39 into each of the bunching dies from whence they are conducted in parallel relation as a bundle 68 around the fillet-forming wheel 17 which is driven directly by the gear 14. The opposite faces of the V-shaped groove in the fillet forming wheel being rough, the bundle of strips is engaged thereby and the tension exerted by the driven forming wheel upon the bundle of strips serves to crowd the latter down into the groove forming a compact fillet 69 of parallel strands or strips having a cross section corresponding to that of the groove. The end of the fillet is introduced between the bead forming wheel 24 and the pressure wheel 28 between which wheels it is compressed into the final form of the bead 70. The peripheral speed of the bead forming wheel 24 is slightly greater than that of the fillet-forming wheel 17 so that in addition to the compacting of the fibers or strands of the fillet 69 between the two wheels 24 and 28, the fillet is also subjected to a longitudinal strain or tension supplementing that of the fillet-forming wheel 17 in taking all slack out of the warp threads and imparting to the bead 70 as it leaves the wheels 24 and 28 the highest degree of tensile resistance as well as compactness. After the forward end of the fabric has been initially slit for a short distance, as stated, by the knives 40, these knives are lowered by the manipulation of the angle lever 44 through its handle 45 and thereafter the quarter inch strips are torn by reason of the fact that the alternate strips pass above and below the separating rolls 38 and 39 and are pulled continuously in a forward direction by their engagement within the groove of the fillet-forming wheel 17.

Assuming that the car 51 having mounted thereon a set of reels 56 has been placed in position beneath the machine frame, the forward end of the bead 70 is attached to such reel and is tightly wound thereon, the reel being frictionally driven through its sheave 61, the loose engagement of which with the belt 60 provides for the increase in diameter due to the addition of successive layers of bead thereon. When the reels of one set are filled the bead 70 is severed and the car 51 is run from beneath the machine, the squared end 57 of its shaft being slipped out of the squared socket of the stub shaft and another car carrying a set of empty reels is run into place and the squared end of its shaft inserted into the squared socket of the stub shaft after which the operation proceeds as before. Between each successive layer of fabric upon the reel 47 is arranged a liner sheet and as the fabric is progressively unwound this liner sheet is wound upon the liner reel 63, which, being likewise frictionally driven from its sheaves 62, takes up the liner sheet as fast as it is unwound from the reel 47 notwithstanding the increase in diameter of the reel due to the layers accumulating thereon. When the advance ends of the four bundles of strips are engaged within the grooves of the fillet forming wheels 17 it may happen that one bundle is less taut than the others and as the fillet-forming wheels are driven at a uniform speed it is desirable that all of the bundles shall be equally taut so that the tension shall be uniformly applied to the sheet of fabric 64. To accomplish this result the ratchet connection between each of the forming wheels 17 and their common shaft 15 is provided, the operator being able to grasp that wheel 17 of which the bundle of strips is slack and by turning the same to the extent of one or more ratchet teeth take up the slack and bring about a uniform tension upon the several bundles of strips.

While I have herein illustrated and described with a considerable degree of particularity constructional details of a machine for carrying out my invention, it is to be understood that the invention is not limited to the employment of a particular machine, that shown and described being merely one of divers mechanical constructions which might be employed to greater or less advantage in connection with the invention which resides in the improved method of making tire beads.

I claim:

1. The method of making a tire bead which consists in separating into narrow strips a sheet of fabric impregnated with sticky composition, bundling a plurality of the strips in substantially parallel relation, and compacting the bundle to produce a bead of the desired cross section, substantially as described.

2. The method of making a tire bead which consists of separating into narrow strips a sheet of fabric impregnated with sticky rubber, bundling a plurality of the strips in substantially parallel relation, and subjecting the bundle to pressure and tension to produce a bead of the desired cross section, substantially as described.

3. The method of making a tire bead which consists in tearing into narrow strips a sheet of fabric impregnated with sticky composition, bundling a plurality of the strips in generally longitudinal relation, and compacting the bundle to produce a bead of the desired cross section, substantially as described.

4. The method of making a tire bead which consists in tearing into narrow strips a sheet of fabric composed of a strong warp and of a comparatively weak weft and impregnated with sticky rubber, bundling a plurality of the strips in substantially parallel relation, passing the bundle through rotary forming rolls to produce a bead of the desired cross section, and curing the bead, substantially as described.

In testimony whereof I have hereunto signed my name in the presence of two subscribing witnesses.

WILLIAM C. STEVENS.

Witnesses:
J. J. SHEA,
S. G. CARKHUFF.